US007020082B2

(12) United States Patent
Bhagavath et al.

(10) Patent No.: US 7,020,082 B2
(45) Date of Patent: Mar. 28, 2006

(54) NETWORK USAGE MONITORING DEVICE AND ASSOCIATED METHOD

(75) Inventors: Vijay K. Bhagavath, San Ramon, CA (US); Joel E. Short, Los Angeles, CA (US); Anurag K. Garg, Los Angeles, CA (US)

(73) Assignee: Nomadix, Inc., Westlake Village, CA (US)

( * ) Notice: Subject to any disclaimer, the term of this patent is extended or adjusted under 35 U.S.C. 154(b) by 828 days.

(21) Appl. No.: 09/849,551

(22) Filed: May 4, 2001

(65) Prior Publication Data

US 2002/0021665 A1     Feb. 21, 2002

Related U.S. Application Data

(60) Provisional application No. 60/202,326, filed on May 5, 2000.

(51) Int. Cl.
*H04J 3/14* (2006.01)
*H04J 1/16* (2006.01)

(52) U.S. Cl. ............... 370/230; 370/235; 370/252; 709/224

(58) Field of Classification Search ............ 370/252, 370/253, 229, 230, 235, 236, 389, 401; 715/736, 715/735; 709/232, 223, 224, 225, 235
See application file for complete search history.

(56) References Cited

U.S. PATENT DOCUMENTS

| 6,026,440 A | 2/2000 | Shrader et al. |
| 6,236,332 B1 * | 5/2001 | Conkright et al. ........... 340/3.1 |
| 6,505,201 B1 * | 1/2003 | Haitsuka et al. .............. 707/10 |
| 6,795,856 B1 * | 9/2004 | Bunch ......................... 709/224 |

FOREIGN PATENT DOCUMENTS

| WO | WO 98/11702 | 3/1998 |
| WO | WO 99/01819 | 1/1999 |

* cited by examiner

*Primary Examiner*—Ajit Patel
(74) *Attorney, Agent, or Firm*—Alston & Bird LLP (57) ABSTRACT

A network usage monitoring module is provided for monitoring network usage at a network access point, i.e. network traffic aggregation point, typically at a gateway device or a similar network interface device. As such, the network usage monitoring module can monitor the usage of a number of network users who are attempting to access various network services provided via the gateway device. Thus, the usage information collected by the usage monitoring module is considerably more robust than that offered by conventional monitoring techniques. As such, the information is considerably more valuable to network service providers, network users, network beneficiaries and the like. In addition, the usage monitoring method and apparatus offers a number of particular features to improve the monitoring process as well as the value of the usage information that is collected.

30 Claims, 5 Drawing Sheets

NETWORK USAGE MONITORING DEVICE AND ASSOCIATED METHOD

CROSS-REFERENCE TO RELATED APPLICATIONS

The present application claims priority from U.S. Provisional patent application Ser. No. 60/202,326, filed on May 5, 2000, the contents of which are incorporated by reference.

FIELD OF THE INVENTION

The present invention relates generally to network usage monitoring and, more particularly, to a network usage monitoring device and associated usage monitoring methods that operate to capture usage data at a point of network access.

BACKGROUND OF THE INVENTION

Communication networks, such as the Internet, corporate intranets and the like, have become the chosen form of information distribution in the workplace, as well as, the home. With the need to access information from such networks increasing, so to is the need to provide a means for monitoring the information distributed by such communication networks. Monitoring of this nature heretofore referred to as "usage monitoring", can provide valuable information, statistical or otherwise, to network service providers, network users or network beneficiaries, such as network advertisers.

The network service providers can benefit from usage monitoring in many different applications; for instance, it will provide the capability to create network user profiles based on the information that the user has accessed and the information that the user has provided to the network. User profiles are beneficial to the service provider in many applications, such as, intelligently caching data (i.e. storing copies of network pages accessed by the user) and/or prefetching data (i.e. predicting future network page access and storing such). Additionally, usage monitoring information is instrumental in case of a network security breach. It provides valuable post-breach information that can be used to trace the history of the breaching party.

Communication networks, such as the Internet, have provided another medium over which advertisers can distribute information and solicit customers. Because of the vast numbers of people who rely upon the Internet on a frequent, if not daily, basis, advertisers have invested enormous amounts of money to deliver advertisements via the Internet. Unfortunately for advertisers, advertisements that are merely distributed on a mass basis are not typically cost effective since many, if not the majority, of the recipients have no interest in the particular product or service being advertised. As such, advertisers commonly work to target the advertisements to a subset of people who are believed to be most interested in the product or service being advertised. For example, new homeowners may be most interested in security systems and, as a result, residential security companies may target their advertising to the new homeowners. To be able to target their potential customer base, the advertisers must be able to access usage monitoring data in a real time fashion and be provided with data that is formatted, or can be readily formatted, to address the demographics to which their particular product is addressed.

Additionally, usage monitoring information can be important to Content Distribution Networks (CDNs) as they serve to optimize their distribution network on the basis of usage information and provide better services to their clients and the subscribers.

Network users, such as households or corporations, can benefit from usage monitoring information by monitoring the usage of individuals within the household or the corporation. Such monitoring insures that the individuals are not accessing inappropriate information or spending an inordinate amount of time browsing the Internet or intranet.

While communication networks, such as the Internet, provide a medium over which an enormous number of people communicate, network service providers, network beneficiaries and the users themselves have generally been unable to determine the exact nature of the users, the content of the information accessed by the users, the demographic breakdown of the users and other usage related information. For example, network advertisers have had difficulty determining, in real-time, both detailed demographics regarding the users and information relating to the actual content requested by the users. Network service providers have had difficulty tracking, in real time, the information accessed by any one user so as to provide more intelligent caching and prefetching capabilities, security breach investigation capabilities and the like. Additionally, the network users (i.e. households or corporations) have not been provided with an adequate means of tracking the use of the individuals (i.e. family members or employees) in terms of content accessed or duration of the access session.

In this regard, current techniques exist for monitoring network usage at different discrete locations within a communication network. For example, network servers and/or routers located within the stream of network communication can monitor usage by keeping logs of access requests for the content hosted by the server. These logs provide information about the number of users that access a particular page or a set of pages and the navigational sequence through the pages. Software is also provided for performing statistical processing of the server logs. Likewise, usage can be monitored at the user level, i.e., at an individual's computer, by keeping, in memory, a log of the content accessed by the user. This log provides information about the usage patterns of the individual user including the content accessed, the navigational sequence through the content and the amount of time spent on each page. Further, some Internet service providers (ISPs) can include a proxy-caching server that stores the most frequently requested information. These proxy-caching servers can be designed to monitor the web content usage of those users that are routed to the network via the proxy-caching server. Unfortunately, proxy-caching servers require user intervention by a network administrator or the like in order to appropriately configure the proxy cache. Further, not nearly all client requests are directed to the proxy-caching server, thereby rendering the usage data incomplete and much less valuable.

As will be noted, each of these prior techniques is associated with and monitors the usage of a discrete device or portion of the web. For example, monitoring that is conducted at the server level and at the user level obviously only identifies usage occurring at the server and by the user, respectively. In addition, monitoring conducted via a proxy-caching server only identifies some of the client requests for a particular ISP network. While these various types of usage monitoring are of some assistance to network service providers, network beneficiaries and network users, these entities desire usage monitoring on a much broader scale covering many different users attempting to access information hosted by many different servers, potentially on the networks of many different service providers.

SUMMARY OF THE INVENTION

A network usage monitoring module is therefore provided for monitoring network usage at a network access point, i.e. network traffic aggregation point, typically at a gateway device or a similar network interface device. As such, the network usage monitoring module of the present invention can monitor the usage of a number of network users who are attempting to access various network services provided via the gateway device. Thus, the usage information collected by the usage monitoring module of the present invention is considerably more robust than that offered by conventional monitoring techniques. As such, the information is considerably more valuable to network service providers, network users, network beneficiaries and the like. In addition, the usage monitoring method and apparatus of the present invention offers a number of particular features to improve the monitoring process as well as the value of the usage information that is collected.

In one embodiment, the usage monitoring method and apparatus captures all bytes of data transmitted between user and network services and records usage information associated with network addresses (i.e., Uniform Reference Locations (URLs)). Typically, the usage monitoring method and apparatus will limit the storage of information to instances where a user gains access to the network service and discards any usage information associated with addresses that are determined to be inaccessible, thereby reducing the size of the resulting database and improving subsequent searching of the database and caching of the database. The usage monitoring method and apparatus also permits the monitoring of streaming content in real time and facilitates the implementation of web-based user surveys. The usage monitoring method and apparatus of the present invention further allows for the monitoring of user query strings as well as information input by a user into a web form.

Importantly, the usage monitoring method and apparatus of the present invention captures navigational sequences that include one or more designated network addresses. In this regard, the designated address can either be designated in advance or determined on the fly by the usage monitoring module to be the most popular addresses. Alternatively, the usage monitoring method and apparatus can monitor the addresses that are in a neighborhood of a designated network address regardless of the sequence or order in which the addresses are accessed. In a similar fashion to the technique by which the usage monitoring method and apparatus of the present invention monitors the addresses in the neighborhood of the designated address, the usage monitoring method and apparatus can monitor the domains that proceed and/or follow a designated domain. Furthermore, the usage monitoring method and apparatus can monitor an associated address that is in the neighborhood of a designated address, i.e., an associated URL that has proceeded or followed a designated address by no more than a predetermined number of addresses, regardless of the particular navigation sequence. The associated address can be defined in many ways and is typically defined by a user or network administrator to identify other associated addresses.

By capturing a more robust set of information related to the usage of the communication network, the usage monitoring method and apparatus of the present invention can provide very useful information to usage monitoring information clients. For example, the usage monitoring method and apparatus can include detailed user demographics and information relating to the content of the accessed sites or of native streaming media. In addition, by monitoring the usage at the gateway to the Internet, i.e., the point of traffic aggregation, the usage monitoring method and apparatus can monitor the usage of a large number of users requesting access to many different service providers.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
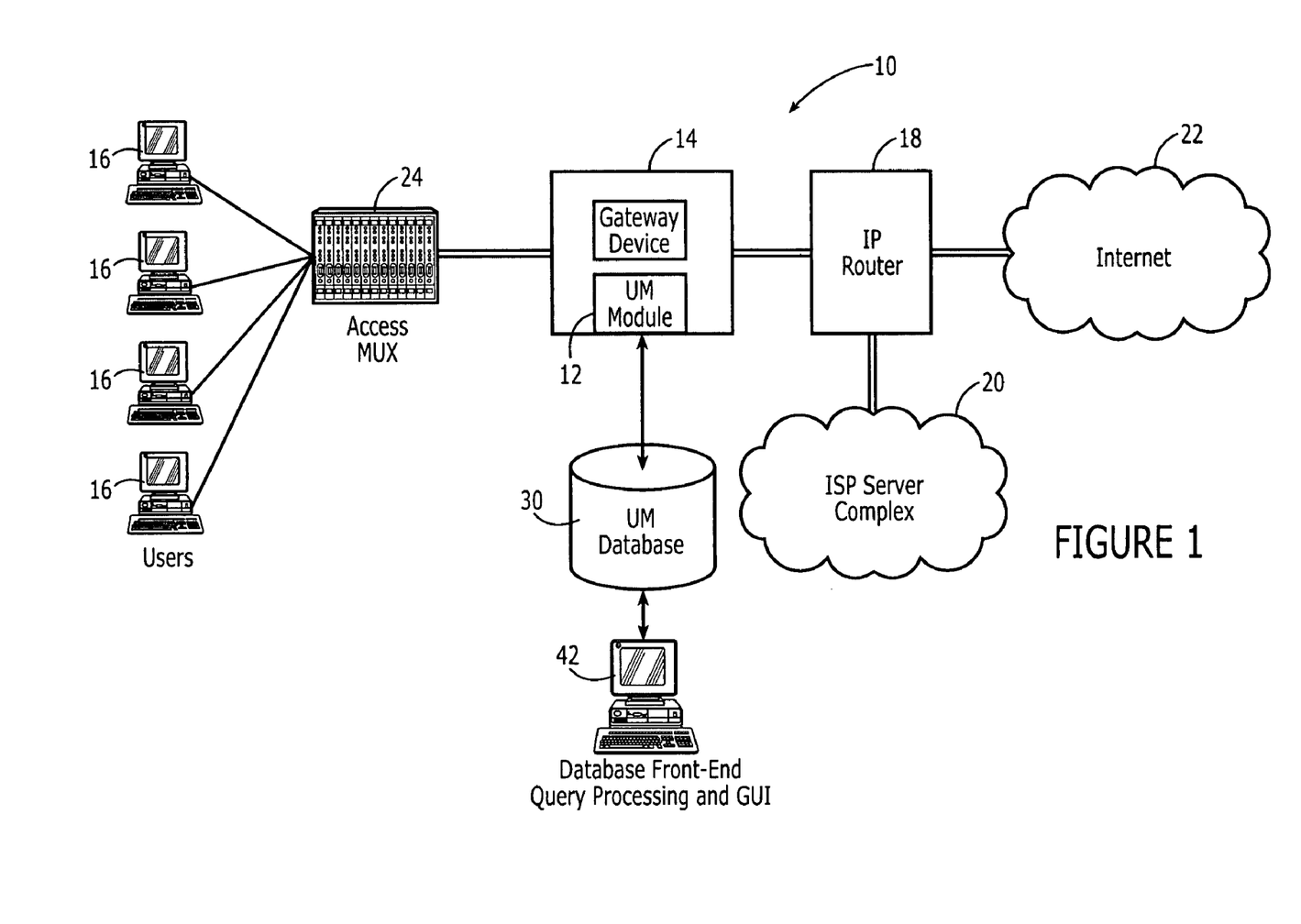
FIG. 1 is a block diagram of the usage monitoring apparatus according to one embodiment of the present invention.

A network 10 implementing usage monitoring, in accordance with the present invention is depicted in FIG. 1. The usage monitoring module 12 is preferably implemented in or disposed in communication with a gateway device 14. For example, in an embodiment in which the usage monitoring module is implemented in a gateway device, the gateway device can be a universal subscriber gateway provided by Nomadix, Inc. of Westlake Village, Calif. and described in U.S. patent application Ser. Nos. 08/816,174, 09/458,602, 09/458,569, 09/541,877 the contents of which are incorporated by reference as if set forth fully herein. Alternatively, the gateway device can be any of a number of other gateway devices capable of implementing programming modules as known to those of ordinary skill in the art. It should be noted that while implementation in conjunction with a gateway device is preferred, the usage monitoring module could be implemented with other devices or be an independent device so long as the module or device implementing the module is positioned in the network so that it receives all requests/queries from a plurality of users and receives all responses coming from all the network services that comprise the network (i.e., a point of network traffic aggregation). In one embodiment of the invention, the gateway device implementing the usage monitoring module will be positioned within the network between a plurality of user devices 16 and the remainder of the communications network (i.e.

router 18, service provider complex 20 and Internet 22). Thus, the usage monitoring module is implemented at a network point of access that serves as a point of traffic aggregation for all network services that are included within the communications network.

The network users can communicate with the gateway device via a number of different user devices 16, such as handheld communication devices, portable communication devices (i.e. laptops), personal computers or the like, which are in communication with the gateway device via an access multiplexor 24. Additionally, depending on the means of communication between the user and the network, the network architecture may include a network interface device (NID) (not shown in FIG. 1) that serves to link the various means of communication, such as DSL, cable, LMDS (Local Multipoint Distribution Services), dial-up, leased line, wireless or the like. While FIG. 1 depicts the communication network users communicating with the network through a single access multiplexer, in a typical communication network multiple access multiplexers will be implemented, as well as multiple network interface devices, to allow for expanded user capabilities.

The gateway device 14 typically permits the users to communicate with a variety of IP network services, offered either by the ISP (Internet Service Provider) or an enterprise network (i.e. corporate intranet or the like). As shown in FIG. 1, the gateway device may be in communication with router 18 that serves to route network communication to the service provider server complex 20, the Internet 22 or any other network service (not shown in FIG. 1). While FIG. 1 depicts a single router, in a typical communications network, multiple routers and/or switching devices will be in communication with the gateway device for properly routing network communications to their addressed destination.

According to the present invention, the usage monitoring module captures all packets transmitted between the users and the network services. Filtering is performed to extract all relevant packets that the usage monitoring client prefers to monitor (such as HTTP requests and responses, DNS requests and responses, etc.) and forwards such to an associated usage monitoring database 30. The requests by a user for network services and the responses from the network services are captured by the usage monitoring database. The usage monitoring database can be either internal to the device implementing the usage monitoring module or external to the device so long as the usage monitoring database is communicably connected to the usage monitoring module. In one embodiment of the invention, the usage monitoring database stores information associated with the HTTP requests and responses and processes the information as described hereinafter.

Figure 2:
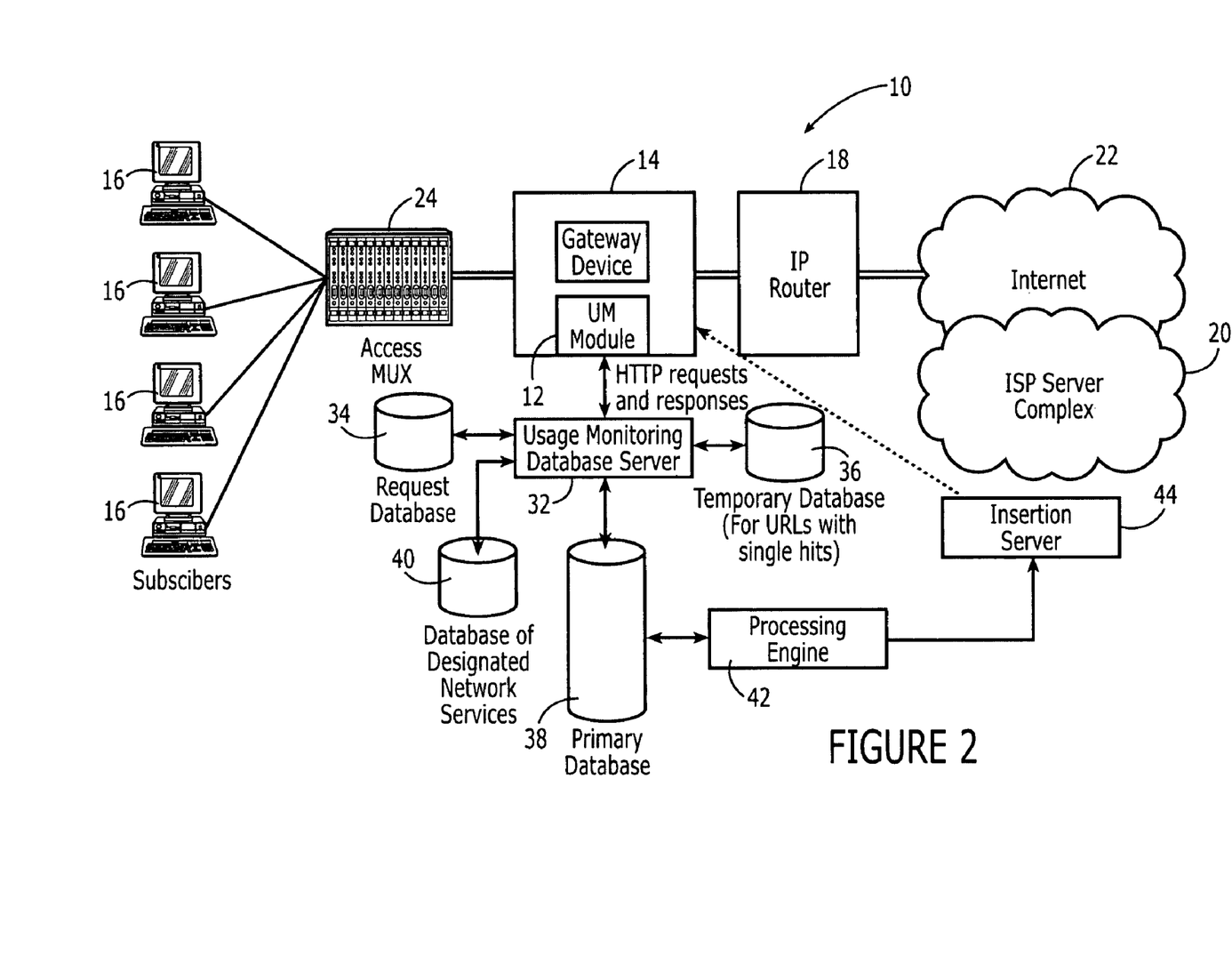
FIG. 2 is a block diagram of the usage monitoring apparatus according to another embodiment of the invention.

FIG. 2 depicts a schematic representation of a network implementing usage monitoring having a series of databases, in accordance with an embodiment of the present invention. As a result of its position at a point of traffic aggregation in the network architecture, the gateway device 14 receives requests from a number of subscribers for Internet or other network services. In this regard, the usage monitoring module implemented in the gateway device is capable of capturing all of the packets since the gateway device operates in a promiscuous mode. In the FIG. 2 embodiment the usage monitoring database is implemented by a usage monitoring database server 32 that has access to auxiliary databases associated with the usage monitoring process.

The usage monitoring module 12 will capture packets and route them to their respective database, in accordance with one aspect of the present invention. If the captured packet represents a request or query from the user, the request is stored in the request database 34. In addition to capturing user request packets, the usage monitoring module will capture packets representing responses and other messages transmitted by the network services. In this regard, the usage monitoring module will match the responses with their respective requests. If the user request or query is successful, i.e. the network service grants access or otherwise responds to the query, then the response is matched with the user request and the information pertaining to this matched set of request/response is forward to either a temporary database 36 or the primary database 38. If the response from the network service indicates that a valid response is not forthcoming, such as access is denied, access is unavailable, a service error has occurred, etc. or if a time-out occurs before a response is received, then the request database deletes the associated request from the database. In a similar fashion, if the response from the network service can not be matched with a user request or if the response occurs outside of a predetermined allowable time window, then the response from the network service is discarded. This aspect of the invention, which provides the capability to discard requests that can not be matched with valid responses and vice versa, allows the usage monitoring apparatus to conserve storage, thereby minimizing the storage space required to support the usage monitoring apparatus. By not permanently storing requests/queries that do not result in successful responses, the primary database 38 can intelligently provide superior performance in the searching/caching operations.

Once the usage monitoring module has matched the user request to the network service response, the information found in the requests and responses is stored in either the temporary database 36 or the primary database 38. The usage monitoring module will determine if the user request is one of a pre-determined number of initial requests to a particular network service, such as a web page. If the determination is made that it is within an initial request or the pre-determined number of initial requests, then the information found in the request and the response is stored in the temporary database. Once the network service has been accessed more than the pre-determined number of times, the information is transferred to and stored in the primary database 38 and subsequent requests/responses are proxied to and stored in the primary database. The implementation of the temporary database accounts for the fact that many network services are only requested a single time or a minimal amount of times and, therefore, the statistical presence of these minimal use requests/responses may not be required when processing of the usage data information occurs. In this regard, the primary database is minimized so as to be more accommodating to subsequent processing of the database by eventual usage monitor information clients (i.e., network service providers, network beneficiaries or network users). The usage monitoring module can be configured so that the predetermined number of initial requests is selected to balance the competing goals of recording all activity of a user and streamlining the database. In some cases, however, the predetermined number is set to 1.

Additionally, the network usage monitoring apparatus of the present invention may include a database of designated network addresses 40. The designated network addresses are typically frequently visited network addresses that are predefined by the network usage monitoring administrator, typically the gateway device administrator or the like. The designated network addresses are most often addresses that the usage monitoring information client deems particularly important. The usage monitoring module allows for navigational sequences to be stored in the database of designated network addresses for those network addresses predefined as "designated". A navigational sequence will typically include a predefined number of immediately preceding and/or immediately succeeding network addresses accessed by the user. For example, a network beneficiary, such as a commercial advertiser, may desire that a particular Internet site be designated for usage monitoring purposes. As such, when a network user accesses the designated Internet site, the usage monitoring module will recognize the network address as being designated and will record and store the preceding and succeeding navigation sequence leading up to and following the access of the designated network address. It should be noted that the navigational sequence could extend beyond a single user session provided the interval between sessions is within a predetermined session window.

In one embodiment of the invention the usage monitoring apparatus is in communication with a processing engine 42 (i.e. database front-end), such as a PC or the like. The processing engine is in communication with the usage monitoring database and accesses the database in conjunction with a GUI (Graphical User Interface) implemented on the processing engine. The processing engine accesses the database in accordance with the commands of the usage monitoring client to process the usage monitoring data according to specific user requirements. In one embodiment of the present invention the processing engine is in communication with an insertion server 44 (shown in FIG. 2). For example, the insertion server may comprise a targeted advertisement insertion server or a targeted survey insertion server. The processing engine implements the necessary commands to determine what advertising or survey would benefit the network provider or the network beneficiary based upon collected usage monitoring data. Once a targeted advertisement or survey determination is made a command is sent to the insertion server and an appropriate advertisement or survey is forwarded to the network user via communication with the gateway device 14. The advertisement or survey will typically be in the form of a pop-up control panel sent to the user's communication device.

Figure 3:
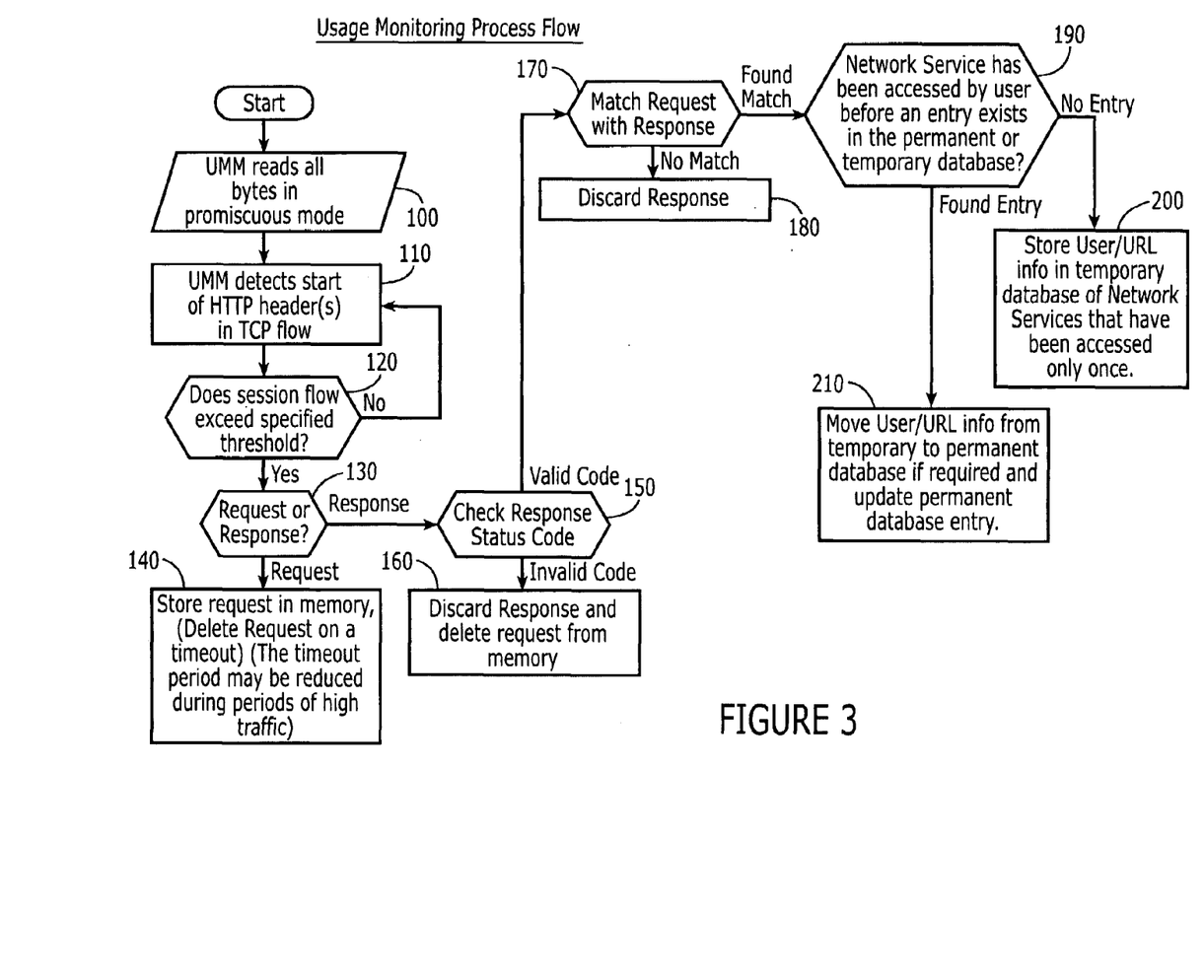
FIG. 3 is a flow chart illustrating the general operations performed by the usage monitoring method and apparatus of one embodiment of the present invention.

FIG. 3 illustrates a flow diagram of a method for usage monitoring, in accordance with an embodiment of the present invention. At step 100, the usage monitoring module, typically implemented on a gateway device, reads all the bytes of information that are being transmitted from the plurality of users who access the network via the gateway device and the bytes coming from the network services. The gateway device will typically operate in a promiscuous mode to insure that all bytes of information, regardless of destination address, are processed by the usage monitoring module. At step 110, the usage monitoring module detects the start of an HTTP (HyperText Transfer Protocol) header in the TCP (Transmission Control Protocol) flow.

The usage monitoring module may be optionally designed so as only to monitor the usage of network users who have accessed more than a predetermined number of different network addresses, such as Internet URL's (Uniform Resource Locator) during a session. This provides for a reduction in the database without significantly impairing the integrity of the data because users who only access a minimal number of addresses may not provide vital statistical data to the usage monitoring client. Therefore, at optional step 120, a determination is made as to whether the current session flow for the user has exceeded the predetermined threshold minimum. If the user has not accessed more than the predetermined number of URL's during a session, the usage monitoring module continues to monitor, at step 110, the requests transmitted by the user, but does not further analyze and store the requests until the number of requests exceed the predetermined threshold.

Once the user has issued more than the predetermined number of requests during a session or if the usage monitoring module does not implement this optional filter, then, at step 130, the usage monitoring module determines if the packets represent a request or a response, typically by analyzing the HTTP header of the packet. If the captured packet represent a request, then at step 140, the request is stored in the request database. If the captured packet represents a response, then at step 150, the response is checked to determine if the status code in the response is a valid or invalid status code.

Usually, while monitoring network service accesses or other requests, the fact that the user might not have been able to access the service for some reason (it may have been a dead link or the server may have been down temporarily) is not taken into account. In one aspect of the invention, however, the response status codes from the requested network service are also monitored in order to record only the addresses of the network services that the user actually gains access to with the other requests being deleted from the database. This can result in a significant saving in storage and processing computation.

The status code is a three-digit integer number returned by the requested server. The first digit of the status code represents the class of the response. Some of the more common status codes returned are:

1) 200 OK
2) 301 Moved Permanently
3) 304 Not Modified
4) 401 Unauthorized
5) 403 Forbidden
6) 404 Not Found
7) 500 Internal Server Error
8) 501 Not Implemented While a status code of 200 indicates that the web page can be visited, the other status codes indicate that the web page can not be visited. If the response status code is determined to be invalid, i.e. a status code other than 200, then, at step 160, the response is discarded and the matching request is deleted from the request database. Additionally, a user request may be deleted from the request database if a predetermined timeout period is exceeded prior to receiving an associated network response. If the response status code is determined to be valid then, at step 170, the network response is matched with the associated user request in the request database. If no match is found for the returned network response such as in instances in which an excessive amount of the time passed between the request and the response, then, at step 180, the network response is discarded.

At step 190, the usage monitoring method and apparatus optionally determines if the matched request/response is in the primary database or the temporary database. While all requests/responses and information associated with such can be stored in the primary database, the usage monitoring method and apparatus of one aspect of the present invention initially, and optionally, stores data in a temporary database if the requested network service has been requested for the first time or, if configured as such, requested for less than a predetermined number of times. Thereafter, the request/response information is transferred to and/or recorded in a primary database once the network service is requested for more than the predetermined number of times. As previously discussed, since many of the network addresses, e.g. Internet URL'S, are only requested a single time the size of the primary database can be minimized while continuing to store all of the network service requests/responses that are visited more than once by any user. This can be accomplished by establishing a separate, albeit temporary, database for network services that are infrequently requested less than a predefined minimum number of times.

Thus, if no entry is found in both the permanent database and the temporary database (or if the minimum threshold limit has yet to be exceeded for entries in the temporary database) then, at step 200, the request/response info is stored in the temporary database. If an entry is found in the permanent database then, at step 210, the permanent database is updated to indicate a new request/response entry. Additionally, if an entry is found in the temporary database and the current access qualifies it for inclusion in the permanent database (i.e., the predetermined minimum threshold limit is being exceeded) then, at step 210, the entry or entries from the temporary database are transferred to the permanent database.

In one embodiment of the invention, the usage monitoring database stores the URL of the request and associated response. In general, a URL will include the protocol prefix, the port number, the domain name, subdirectory names and a file name. In alternate embodiments of the present invention, the usage monitoring database will preferably store, in the primary database, a variety of other data related to the request and the response. In this regard, the following data is typically collected from the request/response and stored in the appropriate database:

a) Subscriber Identification (This identification may be anonymized before being provided to the usage monitor client by mapping it to a random number and will be indexed to user profiles that provide information about the user's age, gender, income, etc.)
b) URL (URL's will be logically arranged in clusters)
c) Timestamp—indicating the time at which the packet was processed by the usage monitoring module.
d) Referring address (obtained from the HTTP header)— typically, the address that provided the hyperlink to the accessed address.
e) Content-type (typically obtained from the HTTP header)
f) Content length
g) Response Status Code
h) User Query String (usually sent as an argument to a CGI (Common Gateway Interface) application or as a result of the network user posting a form).

The preceding listing is not to be construed as exhaustive, other information may also be extracted for the requests/requests as is dictated by the application for which the information will ultimately be used.

Figure 5:
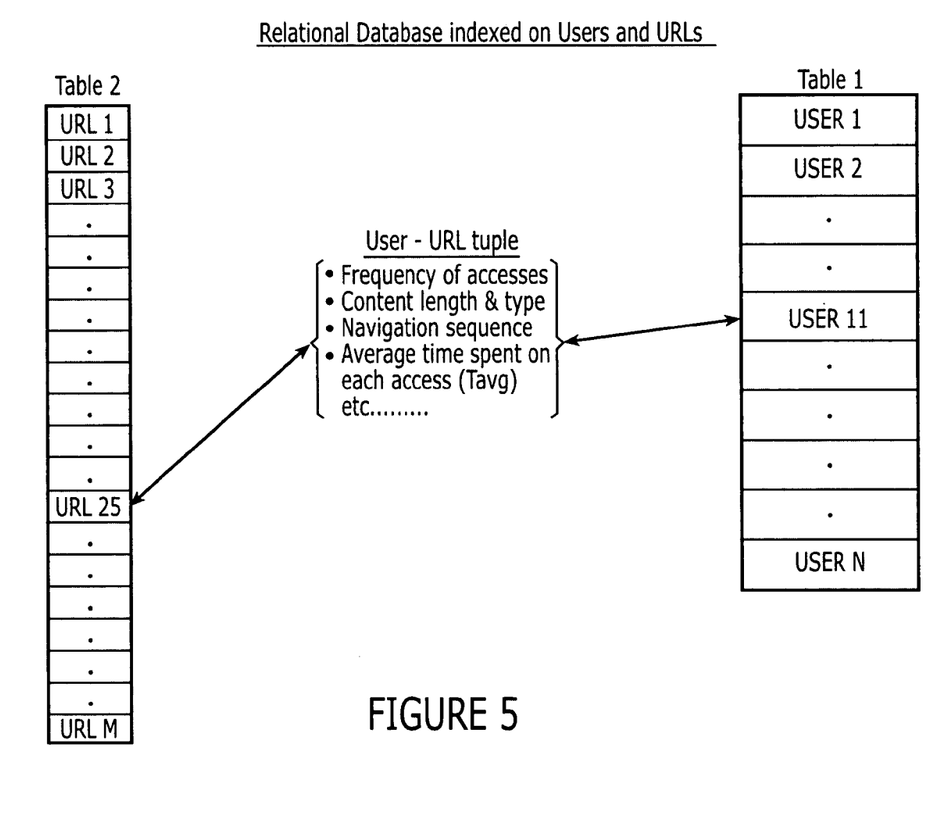
FIG. 5 is a diagram illustrating a relational database that could be utilized by one embodiment of the usage monitoring method and apparatus of the present invention.

While the information included in the user requests and network responses can be stored in different manners, the primary database of one embodiment of the invention is a relational database as depicted in FIG. 5, which relates the users and respective addresses/URLs. A relational database is a well-established way of storing data sets that may have relationships with each other. In this instance, each network user and each accessed address are stored one time only instead of both items being stored every time a network user accesses the address. Each access of a page can then be represented as a node (referred to as a tuple in the context of relational databases) that joins the entry of the user accessing the address and the entry of the address being accessed. This node will then include additional information related to that access/accesses such as time of access, frequency of access, content length and type, etc. For example, in the instance in which user 11 accesses address/URL 25 the relational database stores user 11 in Table 1 and address/URL in Table 2 with a node linking the entry from Table 1 and the entry from Table 2. This form of data storage provides for ease in data retrieval, such that, the usage monitoring client can access all the nodes that a user is linked to in order to compile information.

Figure 4:
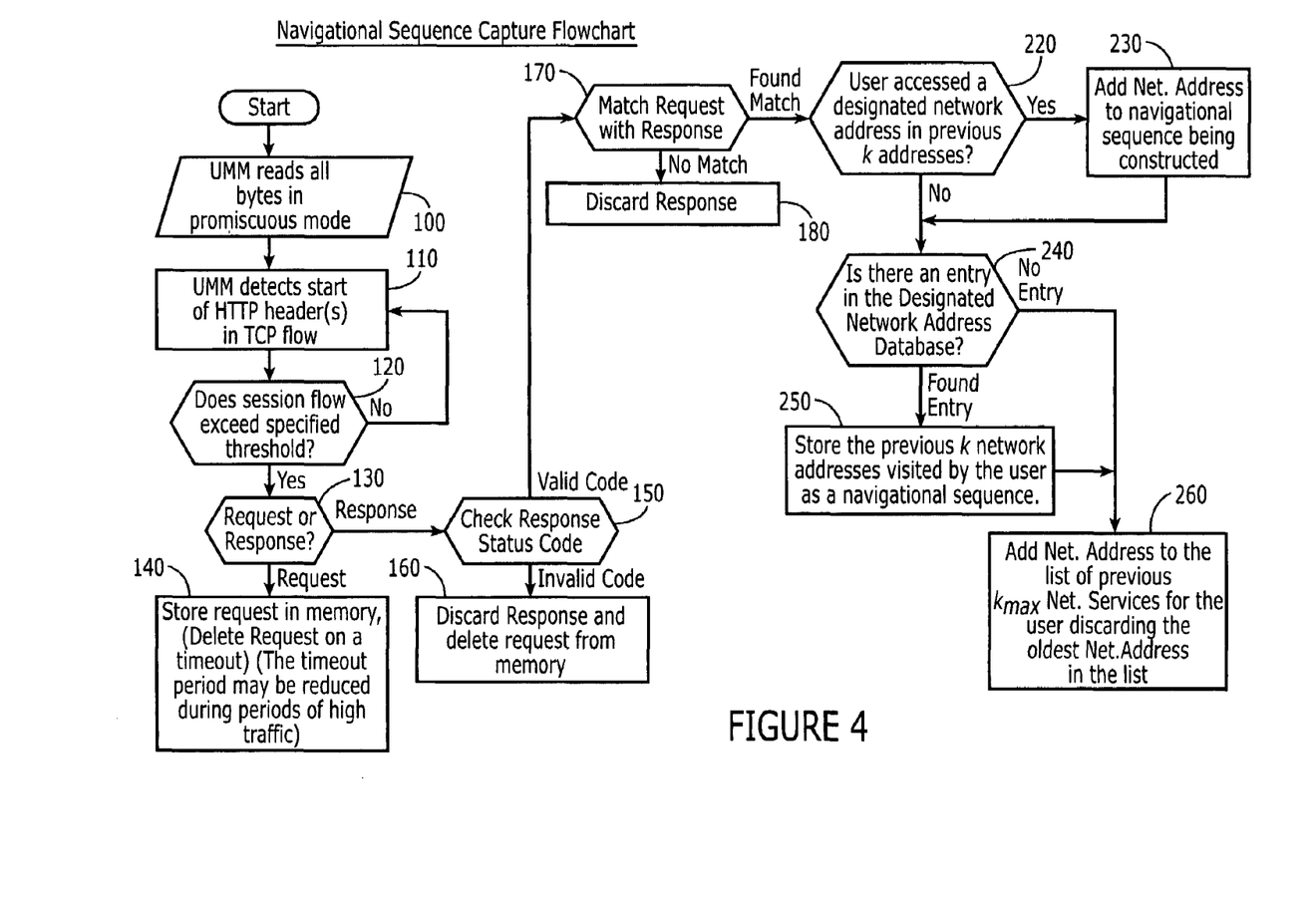
FIG. 4 is a flow chart illustrating the navigational sequencing operations performed by usage monitoring method and apparatus, in accordance with another embodiment of the invention.

In accordance with the flow diagram of FIG. 4, an alternate embodiment of the present invention is diagramed that entails usage monitoring in the form of navigational sequence capturing. Network service providers and network beneficiaries, such as network advertisers, are interested in knowing not only what network services are most frequently accessed and how much time is spent accessing them but also the navigational sequences that include these frequently accessed addresses. The network administrator and/or the gateway administrator, at the bequest of the service provider or network beneficiary, may predefine or "designate" specific network addresses for navigational sequencing monitoring. The administrator will store the designated network addresses in the designated network address database. The navigational sequence related to a designated network address will comprise a predefined number of network addresses that were accessed by the user immediately preceding and/or succeeding the access of the designated network address. It should be noted that while a typical navigational sequence will occur during a single user session, a navigational sequence may extend beyond the single user session provided the interval between two sessions is under a specified threshold. Additionally, a designated network address may be part of more than one navigational sequence; therefore, the usage monitoring module of the present invention may capture and store the following information:

All the navigational sequences the designated network address is a part of.

Only the most popular navigational sequences (which exceed a certain threshold of visits) that a network address is part of.

The frequency of a particular navigational sequence that the designated network address is a part of.

Configuration of the navigational sequence database, typically included in the primary database will be at the option of the network administrator or gateway administrator.

As known by those of ordinary skill in the art, Zipf's Law states that the number of occurrences of a word in a sufficiently long stretch of text is the reciprocal of the order of the frequency occurrence. For example, the $10^{th}$ most frequent word occurs exactly 10 times less frequently than the most frequent word. While a pure Zipf's law relationship does not readily occur, power laws (where the relationship between the order of the frequency of occurrence and the frequency of occurrence is not linear) exist in a wide variety of situations, such as network service access frequency. One consequence of this is that a small number of network addresses accounts for most of the user accesses (e.g. 5% of the available network addresses account for 95% of network accesses). These assumptions imply that statistical data, i.e. navigational sequencing and the like, for only a small percentage of network addresses (e.g. 5%) needs to be readily captured and stored within the usage monitoring database. In this regard, the network service providers and/or the network beneficiaries are provided the option of either predefining the designated network addresses that will be navigational sequence monitored or allowing the usage monitoring module to navigational sequence monitor the most frequently accessed network addresses as defined by the database.

Referring again to the flow diagram of FIG. 4, the usage monitoring module of the present invention monitors the navigational sequences of the designated network addresses in, generally, real-time. It should be noted that steps 100–170 of the FIG. 4 flow are identical to the steps in the FIG. 3 flow diagram and, therefore, further discussion of these steps will not be necessary. Navigational sequence monitoring is accomplished according to the present invention by keeping track of the previous k network addresses accessed by each user in their current session. The number k specifies the number of network addresses preceding and succeeding the designated network address. The k value can be specified by the network or gateway administrator and can differ over different designated network addresses. Although this description indicates that the same number of network addresses are monitored both before and after the designated network address, a different value can be assigned for the preceding and succeeding network addresses, if desired.

At step 220, the usage monitoring module determines whether the network user has accessed a designated network address in the previous k network service accesses. If a determination is made that the network user has accessed a designated network address in the previous k accesses then, at step 230, the current accessed network address is then added to the navigational sequence being constructed. If a determination is made that the network user has not accessed a designated network address in the previous k accesses then, at step 240, the usage monitoring module determines if the current accessed network address is a designated network address by attempting to locate an entry in the designated network address database. If the usage monitoring module determines that the current accessed network address is a designated network address then, at step 250, a command is sent to store the previous k network addresses accessed by the user as a navigational sequence. If the usage monitoring module determines that the current accessed network address is not a designated network address then, at step 260, the current accessed network address is added to the list of $k_{max}$ network addresses for that particular user and the oldest network address in the $k_{max}$ list is discarded if the $k_{max}$ list already has k network addresses. The $k_{max}$ list is stored because it is not known beforehand which network addresses will be accessed by the network user and, thus, the $k_{max}$ list provides for a listing of preceding network addresses if the network user accesses a designated network address and a navigational sequence is required.

In addition to monitoring user access requests and network service responses, the usage monitoring method and apparatus of the present invention can monitor usage of streaming content, in accordance with yet another embodiment of the present invention. The streaming content can either be live or recorded and the capture will occur, as the streaming content is delivered from the native streaming media server to the network user via the gateway device. Streaming content is typically high volume content so it is not possible or practical to store the information related to all streaming content data packets. Therefore, while all streaming content packets are captured at the usage monitoring module a significant portion of the packets will be filtered out to account for this high traffic volume. Constant monitoring of the streaming content packets will allow for significant filtering to occur and will provide information pertaining to the amount of data transferred during the streaming connection, the time duration of the streaming connection, etc. For this constant monitoring to occur the device implementing the usage monitoring module, typically a gateway device, will need to allocate a certain amount of state in memory to keep track of the current or last-known status of the streaming content. Additionally, the usage monitoring module or, alternatively a post processing application, will track users currently accessing streaming content, the site from which the streaming content is coming from, the amount of data transferred during a connection and the last time a streaming content packet was observed for a particular user/streaming content pair. Since there is no explicit connection termination in the case of streaming content, the usage monitoring module will need to implement a timeout to determine when the content steaming terminated. These tracking functions can occur at the usage monitoring module or the unformatted data can be sent on a per streaming packet basis to a post processing application to determine the tracking parameters.

In yet another embodiment of the present invention, the usage monitoring apparatus can be used to provide targeted surveys to network users. As previously discussed an insertion server may be implemented to send targeted surveys to network users based upon usage monitoring data. The surveys may be sent to the network user unsolicited or the network user may choose to participate in the surveys. In this regard, network users may be selected randomly and a pop-up screen will appear at randomly selected times on their communication device. See, for example, U.S. patent application Ser. No. 09/541,877, entitled "Information And Control Console For Use With A Network Gateway Interface" filed Apr. 3, 2000, in the name of inventor Short et al., and assigned to the same assignee as the present invention. The contents of the '877 application are hereby incorporated by reference as if set forth fully herein.

In an alternate embodiment of the present invention, the usage monitoring method and apparatus may also monitor queries that a network user submits to a network service application, such as a search engine or the like. By monitoring the query a network user submits to a network service application such as a search engine, additional knowledge about the user's preferences can be obtained. Current methods of usage monitoring do not provide for the capability to monitor, in real-time, network user queries. Real-time monitoring of network user query strings provides network beneficiaries, such as network advertisers and the like the ability to profile the network user and provide the user with more targeted information. For instance, if a user searches for the model Taurus™ on the Ford™ website, a network advertiser can use this information to direct an advertisement for a competing product to the user.

Another form of user input which can be monitored by the usage monitoring method and apparatus are the web forms posted by a user, such as network service registration forms, application forms and the like. Current methods do not capture information in forms that are submitted by the user on the web.

As previously stated, the network usage monitoring apparatus and method of the current invention provides for the capability to monitor and store a wide spectrum of network user related information. This information includes, but is not limited to, the content of the network service accessed, the demographics of the user population (i.e. user population age, gender, geographical location, service plan, etc.), and the duration that network services are accessed. In this regard, the network service provider or beneficiary will be able to determine real-time statistical properties of users accessing any particular network service at any particular time. For instance, "How many women between the ages of 34 and 55 are currently accessing a specific web-site?" or "What proportion of users listening to a particular classical music station are under 35 years of age?" This information can then be provided to network beneficiaries, who can exploit this information to benefit their core audience in an effective manner.

Main Memory Requirements

The following discussion serves to hypothetically estimate the amount of main memory required to operate the usage monitoring module in accordance with the present invention.

Assuming that the average length of an address is l bytes and the number of active customers is n, the amount of storage can be calculated as $S_n$(Storage in bytes)=$l*2 k_{max}*N$ The worst case storage requirement then depends on N, the total number of users that access the network at this particular access point.

$S_N$(Storage in bytes)=$l*2 k_{max}*N$

ISP (Internet Service Provider) studies indicate that at any time only 10–25% of the users are active. As a result, the typical storage requirement $S_n$ is only about 25% of the worst case storage requirement $S_N$.

The length of a typical packet is usually under 100 bytes though some URL's do extend to more than twice this length. The longer URL's typically result from infrequent queries and as a result do not occur very frequently. Thus, for the purpose at hand, it can be assumed that the average value of l is 100 bytes.

The typical length of a user session varies from 55 minutes for dial-up customers to 95 minutes for DSL customers. And since the average time spent on a webpage by a user is approximately 2 minutes, it is fair to estimate that the number of network addresses visited by any user in one network session is usually of the order of 100. This gives us an upper bound on the value of k.

Thus, if it is assumed that 128 MB of RAM in the primary database is dedicated to storing navigational sequences identified according to this method and the value of k is 100 and l is 100 bytes, the usage monitoring module will be capable of monitoring nearest neighbors for 12,800 users. One can thus conclude that this method scales well in terms of the amount of state required, i.e., the number of preceding and succeeding network addresses that are maintained, and the main memory requirements.

Secondary Storage Requirements

The number of navigational sequences stored in the primary database will typically increase with time as the users visit more of the designated network addresses through different navigational sequences. The number also increases with the value of k as the navigational sequences themselves become longer. There are two ways to reduce the storage required without losing valuable information about the navigational sequences.

Aging the sequences: A timestamp is stored with each navigational sequence. This timestamp indicates the last time the sequence was visited. If the sequence has not been visited for a specified time period it is timed out and is deleted.

Eliminate infrequent sequences: Zipf's law again indicates that only a small proportion of sequences are responsible for most of the accesses. Thus it is possible to weed out the navigational sequences that are visited less than a specified number of times.

In accordance with an alternate embodiment of the present invention, the usage monitoring apparatus and method may be used to capture and store the neighborhood of designated network addresses. In this embodiment, there is no significance given to the order in which network addresses are accessed by the user. The only information stored in the database is the network addresses that occur within a specified number of pages (or time) of the designated network address. The number of network addresses in the neighborhood defined as k, usually increases as the user accesses more network addresses. The number also increases with the value of k. Similar to the secondary storage requirements defined above there are two ways to reduce the storage required without losing valuable information about the neighborhood.

Aging the neighborhood: A timestamp is stored with each network address entry that is part of the neighborhood. This timestamp indicates the last time the network address was visited. If the network service has not been visited for a specified time period it is timed out and is deleted from the neighborhood.

Eliminate infrequent neighbors: Zipf's law again indicates that only a small proportion of network addresses in the neighborhood are responsible for a majority of accesses. Thus it is possible to delete the network addresses that are visited below a specified number of times from the neighborhood.

Just as the previous method describes a way to capture the network addresses neighborhood of a designated network address; it is also possible to capture the domain neighborhood of a designated domain. The advertiser can designate the domains that it wants the usage monitor module to monitor. The usage monitor module then keeps track of the previous k domains that a user has accessed at any time. When the user accesses a designated domain the usage monitor module stores the previous k domains accessed by the user as well as the following k domains that the user will access. Again it is possible to reduce the storage required by aging out domains as well as eliminating infrequently visited domains.

Capturing entire navigational sequences of which the designated network address and a specified list of associated network addresses are part of, may be considered too storage and computation intensive. In this regard, an alternative method is provided for that tracks an associated set of network addresses in the neighborhood of a designated network address, within a large timeout period T (this is to ensure that the storage requirements and state information are reasonable and implementable) and with the associated set of network addresses being typically defined by the gateway or network administrator. In a network advertiser scenario this associated set of network addresses may, for example, belong to competitors of the designated network address. The network advertiser may wish to monitor if prospective customers are visiting a specified list of associated addresses (such as the General Motors, Volvo, BMW or Mercedes websites), while browsing in the neighborhood of a designated network address (such as the Ford website). The usage monitoring module will provide the capability to search the navigational sequences, which include the designated network addresses and the associated network addresses and provide the advertiser with statistics of customers visiting network addresses of associated sites.

As a result of its position at the edge of the communication network, the usage monitoring module according to the present invention can monitor the requests issued by a plurality of users and the responses provided by a number of different network services in order to collect a canonical set of metrics that is useful for network service providers, network users and network beneficiaries. This data can be quite robust and can include web and native streaming content as well as user demographics and navigation sequences. Based upon the robust set of data collected from a plurality of users who are accessing a wide variety of network services and other entities over the Internet, the usage monitoring method and apparatus of the present invention can provide substantial amounts of valuable data to network service providers, network users, network beneficiaries and the like.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for monitoring communication network usage comprising:
a gateway device operating at a network access point that executes a usage monitoring module that captures all request packets transmitted from a plurality of network users and all response packets transmitted from a plurality of network services; wherein the usage monitoring module filters the captured packets to extract usage monitoring data therefrom; and
a usage monitoring database in communication with said usage monitoring module that receives the filtered usage monitoring data from the usage monitoring module and stores the data associated with the user request packets and network response packets, wherein the usage monitoring database stores user monitoring information for network addresses that have only been accessed by a user no more than a predetermined minimum number of times.

2. The system of claim 1, wherein the usage monitoring module filters the captured packets to extract network addresses and the usage monitoring database stores the network addresses.

3. The system of claim 2, wherein the network addresses further comprise URLs (Uniform Resource Locators).

4. The system of claim 1, wherein the usage monitoring module filters the captured packets to extract usage monitoring data comprising at least one type of data chosen from the group consisting of user identification, network addresses, packet timestamp, referring network address, content-type, content length, response status code and user query string.

5. The system of claim 1, wherein the usage monitoring module performs navigational sequencing on captured packets so as to monitor a sequence of network addresses accessed by a user.

6. The system of claim 1, wherein the usage monitoring module performs a status code check on network service response packets to verify that a user has access to a requested network service address so that only data associated with accessible network services is stored in the usage monitoring database.

7. The system of claim 1, wherein the usage monitoring database further comprises a user request database that temporarily stores user request data prior to receiving a response from a requested network service.

8. The system of claim 1, wherein the predetermined minimum number of times is one.

9. The system of claim 1, wherein the usage monitoring database further comprises a designated network address database that stores network addresses that have been designated for navigational sequencing.

10. The system of claim 9, wherein the usage monitoring module is adapted to receive the network addresses that have been designated for navigational sequencing from a usage monitoring client.

11. The system of claim 9, wherein the usage monitoring module defines the network addresses that have been designated for navigational sequencing based on the frequency that a user accesses the network address.

12. The system of claim 1, wherein the usage monitoring database further comprises a primary database that stores the data associated with the user request packets and network response packets.

13. The system of claim 1, further comprising an insertion server in communication with the usage monitoring database that provides network users with targeted information based on network user usage monitoring data.

14. The system of claim 13, wherein the insertion server further comprises an advertisement insertion server that provides network users with targeted advertisements based on network user usage monitoring data.

15. The system of claim 13, wherein the insertion server further comprises a survey insertion server that provides network users with targeted surveys based on network user usage monitoring data.

16. A method for providing usage monitoring in a communications network, the method comprising:
capturing all data packets being transmitted from a plurality of users and a plurality of network services at a gateway device disposed at a network point of access;
filtering the captured packets to provide for usage monitoring data at the gateway device; and
storing the usage monitoring data in a usage monitoring database, wherein storing the usage monitoring data comprises storing the user monitoring data for network addresses that have only been accessed by a user no more than a predetermined minimum number of times.

17. The method of claim 16, wherein filtering the captured packets to provide usage monitoring data further comprises filtering the captured packets to extract usage monitoring data comprising at least one type of data chosen from the group consisting of user identification, network addresses, packet timestamp, referring network address, content-type, content length, response status code and user query string.

18. The method of claim 16, wherein storing the usage monitoring data in a usage monitoring database, further comprises storing the usage monitoring data in a temporary database prior to storing the usage monitoring data in a primary database.

19. A method for providing usage monitoring in a communications network, the method comprising:
capturing a transmitted data packet at a gateway device disposed at a network point of access;
determining, at the gateway device, if the transmitted data packet is a user generated request data packet;
storing the transmitted data packet in a first database if the transmitted data packet is determined to be a user generated request data packet; and transferring the transmitted data packet from the first database to a second database if the transmitted data packet is matched with an accessible network service response data packet, wherein the second database stores the transmitted data packet and the matched network service response data packet if a determination is made that the user has not exceeded a predetermined number of network service address accesses.

20. The method of claim 19, wherein capturing a transmitted data packet at a network point of access further comprises capturing a transmitted data packet at a network gateway device.

21. The method of claim 19, wherein storing the transmitted data packet in a first database if the transmitted data packet is determined to be a user generated request data packet further comprises storing the transmitted data packet in a first temporary database if the transmitted data packet is determined to be a user generated request data packet.

22. The method of claim 19, wherein the second database comprises a primary database that stores the transmitted data packet and the matched network service response data packet if a determination is made that the user has exceeded a predetermined number of network service address accesses.

23. The method of claim 19, further comprising:
determining if the transmitted data packet exceeds a session flow limit so as to warrant storage of the first transmitted data packet in the first database.

24. A method for navigational sequence usage monitoring in a communications network, the method comprising:
designating network addresses requiring navigational sequencing;
capturing, at a network point of access, a user transmitted data packet associated with a network address;
determining if the network address associated with the captured user transmitted data packet is a designated network address; and
storing a predetermined number of network addresses that are accessed proximate the designated network address as a navigational sequence if a determination is made that network address associated with the captured user transmitted data packet is a designated network address, wherein storing a predetermined number of network addresses that are accessed proximate the designated network address as a navigational sequence further comprises storing a predetermined number of network addresses that are accessed either subsequent to or prior to the access of the designated network address as a navigational sequence.

25. The method of claim 24, wherein storing a predetermined number of network addresses that are accessed proximate the designated network address as a navigational sequence further comprises storing a predetermined number of network addresses that are accessed subsequent to and prior to the access of the designated network address as a navigational sequence.

26. The method of claim 24, further comprising:
determining if the user tat sent the user transmitted data packet has accessed a designated network address in a predetermined number of previous network address accesses; and
adding the network address from the user transmitted data packet to a navigational sequencing list if a determination is made that the user has accessed a designated address in the predetermined number of previous network address accesses.

27. The method of claim 24, further comprising storing the designated network address in a database.

28. The method of claim 24, wherein designating network addresses requiring navigational sequencing is based upon determining the most frequently accessed network addresses.

29. The method of claim 24, wherein designating network addresses requiring navigational sequencing is based upon network addresses accessed a predetermined number of times.

30. The method of claim 24, wherein designating network addresses requiring navigational sequencing is based upon usage monitoring client selected network addresses.

* * * * *

UNITED STATES PATENT AND TRADEMARK OFFICE
CERTIFICATE OF CORRECTION

| | | |
|---|---|---|
| PATENT NO. | : 7,020,082 B2 | Page 1 of 1 |
| APPLICATION NO. | : 09/849551 | |
| DATED | : March 28, 2006 | |
| INVENTOR(S) | : Bhagavath et al. | |

It is certified that error appears in the above-identified patent and that said Letters Patent is hereby corrected as shown below:

Column 18,
Line 17, "tat" should read --that--.

Signed and Sealed this

Fifteenth Day of August, 2006

JON W. DUDAS
*Director of the United States Patent and Trademark Office*